US008923153B2

(12) United States Patent
Azizi et al.

(10) Patent No.: US 8,923,153 B2
(45) Date of Patent: Dec. 30, 2014

(54) TECHNIQUES TO UPDATE A WIRELESS COMMUNICATION CHANNEL ESTIMATION

(71) Applicant: Intel Corporation, Santa Clara, CA (US)

(72) Inventors: Shahrnaz Azizi, Portland, OR (US); Thomas J. Kenney, Portland, OR (US); Eldad Perahia, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 104 days.

(21) Appl. No.: 13/667,922

(22) Filed: Nov. 2, 2012

(65) Prior Publication Data

US 2014/0126385 A1    May 8, 2014

(51) Int. Cl.
*H04W 72/00* (2009.01)
*H04L 5/00* (2006.01)
*H04W 24/02* (2009.01)

(52) U.S. Cl.
CPC ............. *H04L 5/0048* (2013.01); *H04W 24/02* (2013.01)
USPC ............ 370/252; 370/330; 375/260; 375/340

(58) Field of Classification Search
CPC ....................... H04L 5/0048; H04L 25/0202
USPC ................. 370/328, 338, 349, 350, 252, 330; 375/260, 340; 342/360, 385, 428
See application file for complete search history.

(56) References Cited

U.S. PATENT DOCUMENTS

| 7,274,728 | B1 | 9/2007 | Kuo |
| 7,522,514 | B2 | 4/2009 | Tzannes et al. |
| 8,126,090 | B1 | 2/2012 | Nabar |
| 8,483,235 | B2* | 7/2013 | Cheong et al. ................. 370/436 |
| 8,649,447 | B2* | 2/2014 | Mohebbi ........................ 375/260 |
| 2003/0103445 | A1 | 6/2003 | Steer et al. |
| 2006/0172704 | A1 | 8/2006 | Nishio et al. |
| 2006/0198294 | A1* | 9/2006 | Gerlach ......................... 370/208 |
| 2007/0165726 | A1 | 7/2007 | Ding et al. |
| 2007/0189406 | A1 | 8/2007 | Kim et al. |
| 2008/0095226 | A1 | 4/2008 | Bar-Ness et al. |
| 2008/0181325 | A1 | 7/2008 | Park et al. |

(Continued)

FOREIGN PATENT DOCUMENTS

| EP | 0725495 | 2/2004 |
| KR | 1020120077350 | 10/2012 |

OTHER PUBLICATIONS

International Search Report and Written Opinion received for PCT Patent Application No. PCT/US2013/048126, mailed Oct. 17, 2013, 9 pages.

(Continued)

*Primary Examiner* — Ahmed Elallam
(74) *Attorney, Agent, or Firm* — Kacvinsky Daisak Bluni PLLC

(57) ABSTRACT

Examples are disclosed for updating a wireless communication channel estimation. In some examples, a packet may be transmitted or received via a communication channel, the packet having one or more pilot signals that may shift between subcarrier frequencies based on a predetermined first variable associated with a first time duration. A second variable associated with a second time duration may be determined by the receiver of the data packet. The second variable may enable a receiver of the data packet to decide how many pilot signals may be used to update an initial channel estimation for the communication channel. Other examples are described and claimed.

30 Claims, 8 Drawing Sheets

(56) References Cited

U.S. PATENT DOCUMENTS

| | | | |
|---|---|---|---|
| 2008/0232239 A1 | 9/2008 | Mujtaba et al. | |
| 2009/0060075 A1* | 3/2009 | Mohebbi | 375/260 |
| 2009/0323837 A1* | 12/2009 | Lee et al. | 375/260 |
| 2010/0034311 A1 | 2/2010 | Hasegawa | |
| 2010/0054194 A1 | 3/2010 | Chauncey et al. | |
| 2011/0116516 A1* | 5/2011 | Hwang et al. | 370/480 |
| 2011/0216808 A1 | 9/2011 | Tong et al. | |
| 2011/0222504 A1 | 9/2011 | Ma et al. | |
| 2012/0020427 A1 | 1/2012 | Butussi et al. | |
| 2012/0207253 A1 | 8/2012 | Park et al. | |
| 2013/0022158 A1* | 1/2013 | Panicker et al. | 375/343 |
| 2013/0070605 A1 | 3/2013 | Ghosh et al. | |
| 2013/0223359 A1* | 8/2013 | Kenney et al. | 370/329 |
| 2014/0010324 A1* | 1/2014 | Kenney et al. | 375/284 |
| 2014/0050255 A1* | 2/2014 | Azizi et al. | 375/219 |
| 2014/0126385 A1 | 5/2014 | Azizi et al. | |

OTHER PUBLICATIONS

"IEEE 802.11-11/1137r1—Proposed Specification Framework for TGah", IEEE P802.11 Wireless LANs, Sep. 2012, 36 pages.

International Search Report and Written Opinion received for PCT Patent Application No. PCT/US2014/027167, mailed Aug. 7, 2014, 10 pages.

International Search Report and Written Opinion received for PCT Patent Application No. PCT/US2013/025943, mailed Feb. 13, 2013, 11 pages.

International Search Report and Written Opinion received for PCT Patent Application No. PCT/US2013/027782, mailed Jun. 14, 2013, 9 pages.

Sofer, et al., "Deployment Scenarios with reuse 1 (utilizing FUSC and PUSC concept)", IEEE 802.22-06/0109r2, Jul, 9, 2006, 16 pages.

* cited by examiner

600

RECEIVE A PACKET VIA A COMMUNICATION CHANNEL, THE PACKET HAVING ONE OR MORE PILOT SIGNALS ASSIGNED TO ONE OR MORE OF A PLURALITY OF SUBCARRIER FREQUENCIES, THE ONE OR MORE PILOT SIGNALS TO SWEEP THROUGH AT LEAST A PORTION OF THE PLURALITY OF SUBCARRIER FREQUENCIES DURING RECEIPT OF THE PACKET AT TIME DURATION N, WHERE TIME DURATION N EQUALS A FIRST TIME DURATION BEFORE A GIVEN PILOT SIGNAL AT A GIVEN SUBCARRIER FREQUENCY SHIFTS TO ANOTHER GIVEN SUBCARRIER FREQUENCY
602

DETERMINE TIME DURATION M, WHERE TIME DURATION M EQUALS A SECOND TIME DURATION OVER WHICH THE ONE OR MORE PILOT SIGNALS ARE RECEIVED BY THE RECEIVE MODULE DURING RECEIPT OF AT LEAST A PORTION OF THE PACKET
604

DETERMINE AN INITIAL CHANNEL ESTIMATION FOR THE COMMUNICATION CHANNEL BASED ON INFORMATION INCLUDED IN A PREAMBLE OF THE PACKET AND UPDATE THE INITIAL CHANNEL ESTIMATION BASED ON AT LEAST A PORTION OF THE ONE OR MORE PILOT SIGNALS RECEIVED OVER TIME DURATION M
606

*FIG. 6*

Storage Medium 700

Computer Executable
Instructions for 600

*FIG. 7*

TECHNIQUES TO UPDATE A WIRELESS COMMUNICATION CHANNEL ESTIMATION

RELATED CASE

This application is related to commonly owned U.S. patent application Ser. No. 13/628,613, filed on Sep. 27, 2012 and entitled "Channel Estimation and Tracking", the entirety of which is hereby incorporated by reference.

BACKGROUND

Wireless devices may include capabilities to access networks using various wireless access technologies. For example, these wireless devices may communicatively couple to each other through a wireless local area network (WLAN) using wireless technologies such as Wi-Fi™. The trend over the past few years has to been to incrementally increase the data rate and bandwidth of Wi-Fi-based WLANs. These increases have been made in a somewhat controlled interior environment within a building or a home. However, recent efforts are being made to interconnect wireless devices in large networks via Wi-Fi-based WLANs. These large networks may be deployed to cover a relatively larger area compared to traditional WLANs (e.g., a neighborhood or several city blocks).

Wireless devices in large networks may communicate via wireless communication channels passing through exterior environments in addition to the interior environments that traditionally related to Wi-Fi deployments. These exterior environments may be continually changing and unique. Thus wireless devices communicating in an exterior environment present a challenge to use of existing Wi-Fi WLAN standards that were primary established for controlled interior environments.

BRIEF DESCRIPTION OF THE DRAWINGS

FIG. 6 illustrates an example of a logic flow.
FIG. 7 illustrates an example of a storage medium.

DETAILED DESCRIPTION

Figure 1:
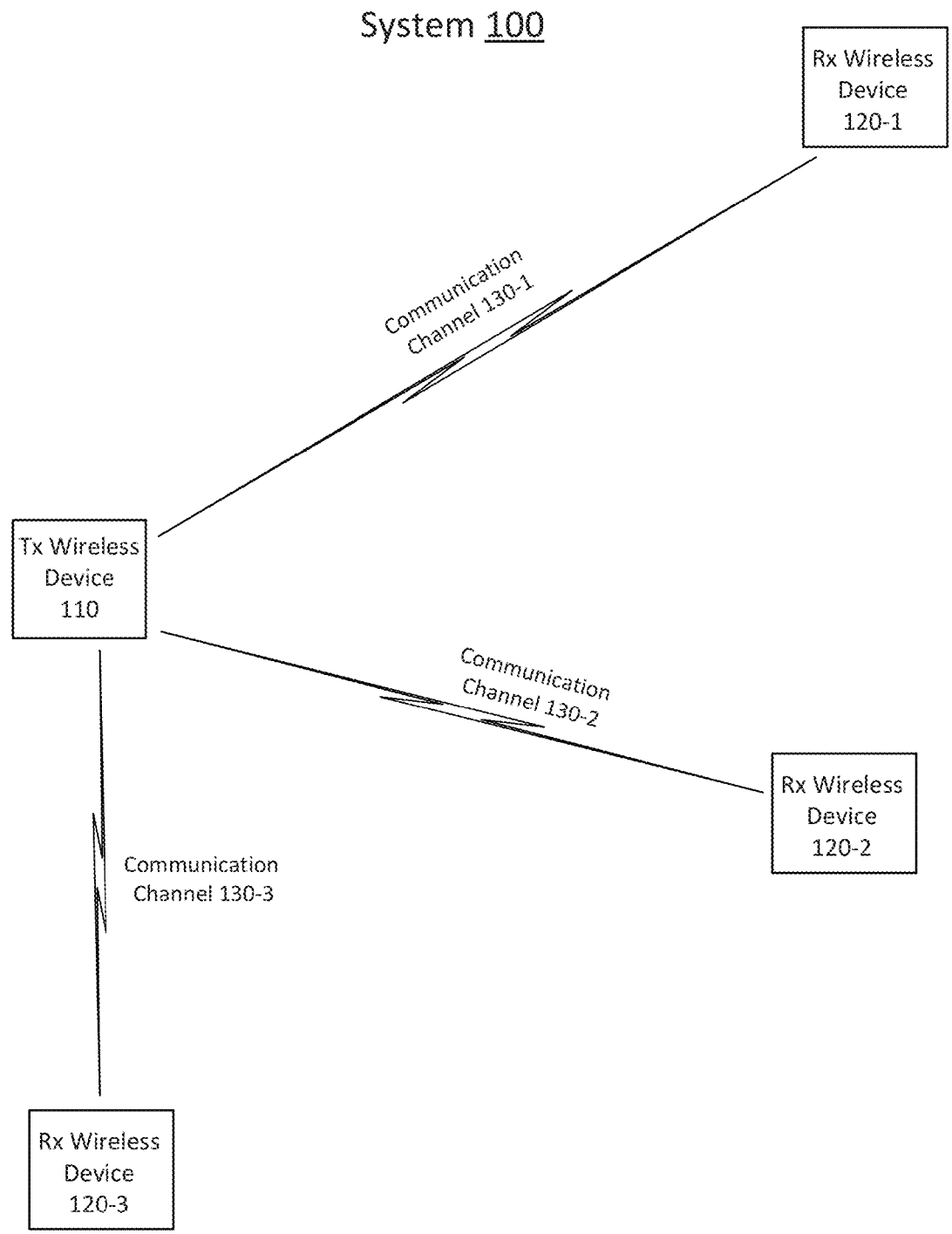
FIG. 1 illustrates an example of a system.

Examples are generally directed to improvements for WLANs set up in exterior or interior environments using wireless technologies associated with Wi-Fi. These wireless technologies may include wireless technologies suitable for use with wireless devices or user equipment (UE) deployed in a sensor network. For example, wireless devices operating or coupled to a WLAN may be configured to operate in compliance with various WLAN standards promulgated by the Institute of Electrical Engineers (IEEE). These WLAN standards may include Ethernet wireless standards (including progenies and variants) associated with the IEEE Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11").

This disclosure is not limited to WLAN related standards, but may also apply to wireless wide area networks (WWANs) and 3G or 4G wireless standards (including progenies and variants) related to wireless devices, user equipment or network equipment included in WWANs. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9 or 10 of LTE/System Architecture Evolution (SAE), and so forth. The examples are not limited in this context.

In some examples regarding WLANs, one IEEE standard associated with IEEE 802.11 is currently under development by an IEEE task force and is known as IEEE 802.11ah. Compared to other IEEE standards associated with IEEE 802.11 such as IEEE 802.11a/g or IEEE 802.11ac, IEEE 802.11ah targets lower data rates and narrower bandwidths centered at frequencies below 1 gigahertz (GHz). An initial draft standard for IEEE 802.11ah having a proposed title of "Sub 1 GHz license-exempt operation" is expected to be released sometime in 2013. IEEE 802.11ah targets lower data rates and narrower bandwidths primarily to allow for an expansion of the area covered by Wi-Fi-based WLANs. Operating at sub 1 GHz may provide longer range communication.

The lower data rates and narrow bandwidths associated with IEEE 802.11ah may lead to data packets that may be 10's of milliseconds long. Long data packets along with the dynamic/unpredictable nature of exterior environments may lead to unacceptable error rates. In particular, even modest Doppler effects have been shown to severely degrade reception of these long data packets without additional training sequences during receipt of the data packet.

One solution to Doppler effects is the use of pilot signals or symbols to track a wireless communication channel's state during receipt of data packets. In some examples, a wireless device transmitting the data packet may insert pilot signals and the pilot signals may then be shifted across a band of subcarrier frequencies. For these examples, information obtained from the shifting pilot signals may be used by logic and/or features of a wireless device to compute or update a wireless communication channel estimation. Thus, the state of the wireless communication channel may be dynamically tracked.

The use of shifting pilot signals may be effective in addressing Doppler effects. However, Doppler effects may not be present in certain scenarios or during certain time periods of a 24-hour day. For examples, wireless devices may be located in areas where rapidly moving objects such as vehicles are either not present or are not close enough to cause Doppler effects. The vehicles may not be present due to wireless devices being deployed away from roads or highways or the wireless device may be communicating during time periods with little to no vehicle traffic. Also, in interior deployment scenarios, little to no Doppler effects may occur during any time of the 24-hour day due to a likely absence of rapidly moving objects such as vehicles. Since Doppler effects may not always be present, a receiving wireless device may waste possibly limited processing power in both receiving and analyzing all or some of the shifting pilot signals.

In some examples, some type of signaling by a transmitting wireless device to indicate whether shifting pilot signals are being used may be needed to allow for a receiving wireless device to save computing resources. However, IEEE 802.11ah currently has no effective method to enable the transmitting wireless device to indicate selective use of pilot signals such that the physical layer (PHY) of the receiving wireless device can turn on, turn off or adjust analysis of received pilot signals. It is with respect to these and other challenges that the examples described herein are needed.

In some examples, techniques are implemented for updating a wireless communication channel estimation. These techniques may include receiving, at a wireless device, a packet (e.g., a data packet) via a communication channel, the packet having one or more pilot signals assigned to one or more of a plurality of subcarrier frequencies. The one or more pilot signals may sweep through at least a portion of the plurality of subcarrier frequencies during receipt of the packet at time duration N. For these examples, time duration N may equal a first time duration before a given pilot signal at a given subcarrier frequency shifts to another given subcarrier frequency. The techniques may also include determining an initial channel estimation for the communication channel based on information included in a preamble of the packet (e.g., a long training sequence). A determination of time duration M may then be made. Time duration M may equal a second time duration over which the one or more pilot signals are received during receipt of at least a portion of the packet via the communication channel. The initial channel estimation may then be updated based on at least a portion of the one or more pilot signals received over time duration M so that the wireless device may adaptively analyze the one or more received pilot signals.

FIG. 1 illustrates an example system 100. In some examples, as shown in FIG. 1, the system 100 includes transmitting (Tx) wireless device 110 and receiving (Rx) wireless devices 120-1 to 120-3. Also, as shown in FIG. 1, Tx wireless device 110 may communicatively couple to Rx wireless devices 120-1, 120-2 and 120-3 via communication channels 130-1, 130-2 and 130-3, respectively. In some examples, the term "wireless device" as used herein includes a device capable of wireless communication, a communication device capable of wireless communication, a mobile terminal, a communication station capable of wireless communication, a portable or non-portable device capable of wireless communication, mobile terminal, etc.

In some examples, the wireless devices included in system 100 may be arranged to operate according to the one or more wireless network technologies associated with IEEE 802.11 such as IEEE 802.11ah. The wireless devices included in system 100 may be part of a sensor network. The sensor network may be a wireless or wired network of nodes in which at least some of the nodes (e.g., wireless devices) collect sensor data. For example, Tx wireless device 110 and Rx wireless devices 120-1 to 120-3 may be spatially distributed and at least some of these wireless devices may include sensors to cooperatively monitor physical or environmental conditions (e.g., electricity usage, gas usage, temperatures, wind, moisture, pollution monitoring, ground movement, etc.). Some or all of these wireless devices may be deployed outside of buildings and thus may be subject to changing environmental conditions.

According to some examples, Tx wireless device 110 may establish communication channel 130-1 with Rx wireless device 120-1 to wirelessly transmit packets such as data packets. For these examples, communication channel 130-1 may include use of 32 subcarrier frequencies in an orthogonal frequency-division multiplexing (OFDM) symbol set to transmit data associated with a data packet. This disclosure is not limited to 32 subcarrier frequencies or to OFDM symbol sets. Other types of signaling that may allow more than one user access to a wireless network are contemplated. The other types of signaling may include, but are not limited to, code division multiple access (CDMA), synchronous code division multiple access (S-CDMA) or time division multiple access (TDMA).

In some examples, Rx wireless device 120-1 receiving data packets via communication channel 130-1 may include logic and/or features to perform channel estimation for communication channel 130-1. For these examples, channel estimation (variant definitions such as channel detection, channel response characterization, channel frequency response characterization, etc.) may be an instrument by which at least some characteristics of communication channel 130-1 (e.g., attenuation, filtering properties, noise injection, and the like) may be modeled and compensated for by the logic and/or features of Rx wireless device 120-1.

According to some examples, logic and/or features of Tx wireless device 110 may include information in a preamble of a data packet to enable Rx wireless device 120-1 to determine an initial channel estimation for communication channel 130-1. For example, the information included in the preamble may include one or more training sequences such as long training sequences to enable Rx wireless device 120-1 to model at least some characteristics of communication channel 130-1 to determine the initial channel estimation. However, as mentioned previously, Tx wireless device 110 or Rx wireless device 120-1 may be deployed outside of buildings and subject to changing environmental conditions. These changing environmental conditions (e.g., moving objects such as vehicles) may cause Doppler effects that may degrade communication channel 130-1 and cause that initial channel estimation to quickly become inaccurate.

Also as mentioned previously, pilot signals or symbols may be used to track a wireless communication channel's state during receipt of a data packet to possibly compensate for Doppler effects. In some examples, Tx wireless device 110 may include logic and/or features to insert pilot signals in shifting subcarrier frequencies to allow Rx wireless device 120-1 to compensate for possible Doppler effects on communication channel 130-1. As Rx wireless device 120-1 receives the data packet, pilot signals received along with the data packet may be analyzed in order to allow for one or more updates to the initial channel estimation.

In some examples, as described more below, Tx wireless device 110 may include logic and/or features to indicate to Rx wireless device 120-1 how often or for how many OFDM symbol counts a pilot signal may dwell at a given subcarrier frequency before shifting to another subcarrier frequency while receiving a data packet via communication channel 130-1. For example, Tx wireless device 110 may indicate that one or more pilot signals may sweep through at least a portion of a plurality of subcarrier frequencies during receipt of the data packet at time duration N (N=any positive integer). Time duration N may equal or represent the dwell time before a given pilot signal at a given subcarrier frequency shifts to another given subcarrier frequency. In some examples, each unit of time duration N may be based on an OFDM symbol count incremented responsive to receipt of each OFDM symbol set such that a value of N=1 indicates one OFDM symbol count.

In some examples, logic and/or features at Rx wireless device 120-1 may determine time duration M (M=any positive integer). Time duration M may equal or represent a time over which one or more pilot signals included with a data packet transmitted by Tx wireless device 110 are received by Rx wireless device 120-1 during receipt of at least a portion of the data packet via communication channel 130-1. For these examples, based on the determined value of time duration M, logic and/or features of Rx wireless device 120-1 may update the initial channel estimation of communication channel 130-1 based on at least a portion of the one or more pilot signals received over time duration M. For example, if time duration M is determined to represent a time over which 2 pilot signals are received (e.g., M=2), then the updated initial channel estimation may be updated based on 2 received pilot signals. In some examples, each unit of time duration M may be based on an OFDM symbol count incremented responsive to receipt of each OFDM symbol set such that a value of M=1 indicates one OFDM symbol count. As described more below, time duration M may be determined by the logic and/or features of Rx wireless device 120-1 based on characteristics associated with communication channel 130-1 (e.g., Doppler effects or signal-to-noise ratio (SNR)), characteristics of the data packet or a modulation coding scheme (MCS) used to transmit or receive the data packet.

According to some examples, Tx wireless device 110 may indicate time duration N to Rx wireless device 120-1 in several different ways. One way may include beacon packets broadcast to all of the Rx wireless devices included in system 100. The beacon packets may indicate that Tx wireless device 110 has established or determined a fixed value for time duration N. The fixed value for time duration N may enable Rx wireless devices 120-1 to 120-3 to determine when pilot signals sent with data packets from Tx wireless device 110 shift between subcarrier frequencies.

In some examples, Tx wireless device 110 may serve some management role (e.g., serve as an access point) for a wireless network including the wireless devices of system 100. For these examples, Tx wireless device 110 may separately indicate to Rx wireless devices 120-1 to 120-3 a fixed value for time duration N. The separate indications may be included in a management packet for an association exchange between Tx wireless device 110 and each of Rx wireless devices 120-1 to 120-3.

According to some examples, Tx wireless device 110 may indicate a fixed value for time duration N in each data packet transmitted to Rx wireless devices 120-1 to 120-3. For examples, a fixed value for time duration N may be included in a preamble (e.g., in a signal field used to indicate packet parameters) for each data packet transmitted. This way of indicating a value for time duration N may allow for the greatest flexibility of allowing Tx wireless device 110 to adaptively adjust the value for time duration N. But the flexibility may come at the cost of reduced bandwidth resulting from adding information to the preamble of each data packet.

Figure 2:
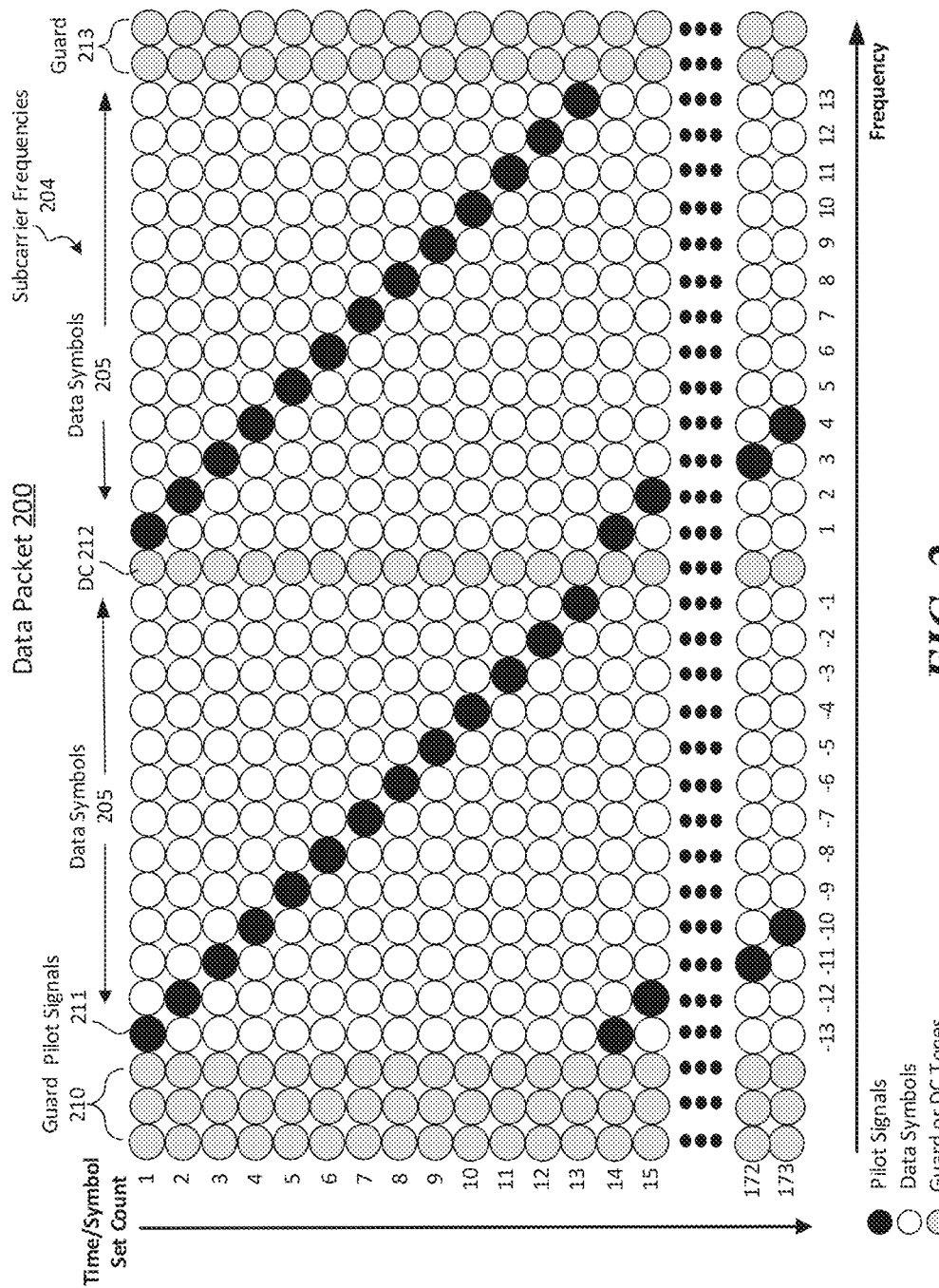
FIG. 2 illustrates an example first data packet.

FIG. 2 illustrates an example first data packet. According to some examples, as shown in FIG. 2, the example first data packet includes data packet 200. For these examples, data packet 200 shown in FIG. 2 may include a plurality OFDM symbol sets. Each OFDM symbol set utilizes multiple symbols modulated by distinct subcarrier frequencies 204. Data packet 200 may represent the payload of a data packet and assumes that the preamble or header information has already been received by a wireless device that may be receiving data packet 200.

According to some examples, each OFDM symbol set as shown in FIG. 2 may include pilot signals 211, data symbols 205, guards 210 and 213 and direct current (DC) 212, although other configurations of a given OFDM symbol set are possible. DC 212 and guards 210, 213 may be collectively called null subcarriers/tones (null tones) and may be used to protect against adjacent channel interference. Also, symbols associated with guards 210, 213 are left blank (e.g., no data) to allow for fitting the transmitted waveform into a transmit spectral mask with less costly implementation.

In some examples, pilot signals 211 may be assigned to one or more data symbols 205 (i.e., subcarrier frequencies not including guard or DC tones) for each OFDM symbol set. For these examples, as shown in FIG. 2, pilot signals 211 may sweep through subcarrier frequencies assigned to data symbols 205 as a function of time. In other words, pilot signals 211 may be modulated by one or more given subcarrier frequencies in each of the OFDM symbol sets but may be disposed at a different subcarrier positions in different OFDM symbol sets after dwelling at a given subcarrier frequency for a given amount of time. A dwell time, for example, may be based on an OFDM symbol set count. According to some examples, the amount of time pilot signals 211 may dwell at the given subcarrier frequency may be represented by time duration N. As mentioned previously, time duration N may be indicated by the wireless device transmitting data packet 200 via a wireless communication channel to enable the receiving device to determine where the pilot signals will be located.

According to some examples, as shown in FIG. 2, pilot signals 211 dwell at a given subcarrier frequency for a time period equal to the amount of time it takes for a receiving wireless device to receive 1 OFDM symbol set. As a result, time duration N may be based on an OFDM symbol count. As shown in FIG. 2, for each increment of the symbol set count, pilot signals 211 sequentially shift to different subcarrier frequencies. Thus, for data packet 200 time duration N=1.

In some examples, a receiving wireless device may be informed that time duration N=1 and may also know (e.g., via preamble information or standard procedures) that pilot signals 211 for data packet 200 are first inserted at subcarrier frequencies −13 and 1. Thus, for these examples, as shown in FIG. 2, pilot signals 211 shift or sweep through subcarrier frequencies 204 following each incremented OFDM symbol count in a sequential manner. This disclosure is not limited to only a sequential manner or to a particular subcarrier frequency for starting the shifting of pilot signals 211. Also, this disclosure is not limited to the number of pilot signals 211 and their respective spacing in a given OFDM symbol set as shown in FIG. 2. More or less pilot signals 211 having uniform or non-uniform spacing are also contemplated.

In some examples, logic and/or features at a receiving wireless device may use information associated with received pilot signals 211 to update an initial channel estimation for the communication channel used to transmit data packet 200. The information may enable the logic and/or features to accommodate changes in the communication channel as each OFDM symbol set is received.

Figure 3:
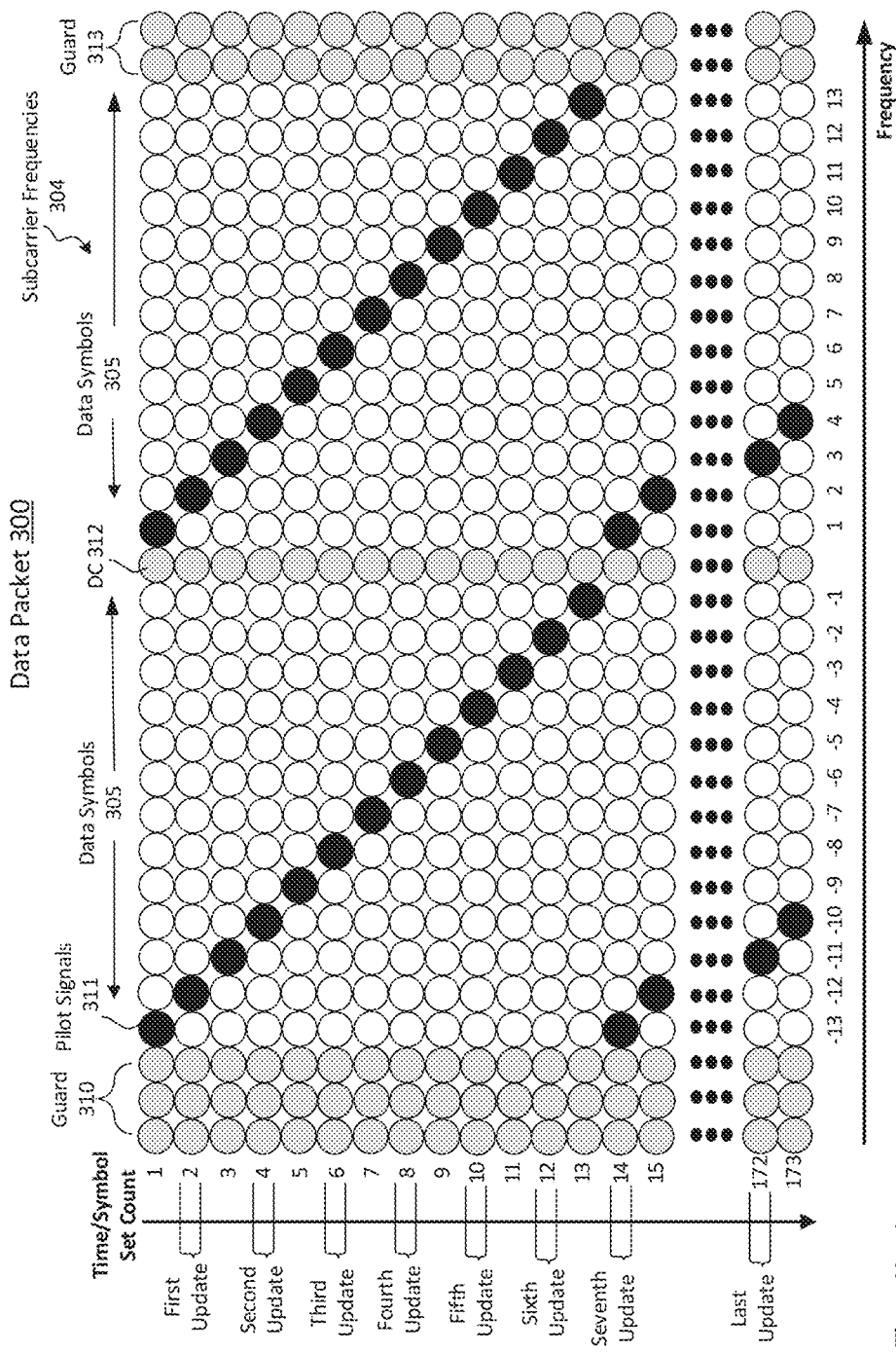
FIG. 3 illustrates an example second data packet.

FIG. 3 illustrates an example second data packet. According to some examples, as shown in FIG. 3, the example second data packet includes data packet 300. For these examples, similar to data packet 200 shown in FIG. 2, data packet 300 may include a plurality of OFDM symbol sets utilizing multiple symbols modulated by distinct subcarrier frequencies 304. Also, similar to data packet 200, data packet 300 may represent the payload of a data packet and assumes that the preamble or header information has already been received by a wireless device that may be receiving data packet 300.

According to some examples, similar to data packet 200, each OFDM symbol set of data packet 300 as shown in FIG. 3 may include pilot signals 311, data symbols 305, guards 310, 313 and DC 312.

According to some examples, the amount of time pilot signals 311 may dwell at the given subcarrier frequency may be represented by time duration N. For these examples, time duration N may be indicated by the wireless device transmitting data packet 300 via a wireless communication channel. Also, as shown in FIG. 3, time duration N=1.

In some examples, logic and/or features at a wireless device receiving data packet 300 may be arranged to determine how many pilot signals may be analyzed before updating an initial channel estimation of the communication channel via which data packet 300 is transmitted. As mentioned above for FIG. 1, the number of pilot signals may be based on time duration M. For these examples, as shown in FIG. 3, the logic and/or features of the receiving wireless device may have determined that a value of 2 for time duration M may be appropriate. Also for these examples, each unit value for time duration M may correspond to 1 symbol set count. So, as shown in FIG. 3, time duration M=2 would equate to 2 symbol set counts.

According to some examples, the initial channel estimation of the communication channel may be updated based on at least a portion of pilot signals 311 received over 2 symbol set counts. For example, rather than updating the initial channel estimation of the communication channel following receipt of pilot signals 311 included in each OFDM symbol set, time duration M=2 may result in using pilot signals 311 included in every other OFDM symbol set (however, skipped pilot signals 311 may still be used to update other parameters in the receiver). So for the first update, pilot signals assigned to subcarrier frequencies −12 and 2 would be used to update the initial channel estimation. Pilot signals 311 included in OFDM symbol set 3 would then be skipped and pilot signals 311 included in OFDM symbol set 4 would then be used for the second update. Following this example sequence, as shown in FIG. 3, updates to the initial channel estimation may occur until pilot signals 311 included in the last even-numbered OFDM symbol set 172 are received.

In some examples, a value for time duration M may be determined based on characteristics associated with the communication channel used to transmit data packet 300, characteristics of data packet 300 or a MCS used to transmit and receive data packet 300. Characteristics associated with the communication channel may include, but are not limited to, an estimate of Doppler effects or SNR. Characteristics of data packet 300 may include, but are not limited to, an amount of data included in data packet 300 and/or a length (e.g., symbol set count) of data packet 300. The MCS scheme used to transmit and receive data packet 300 may include, but is not limited to, types of MCSs associated with IEEE 802.11ah such as MCS0 or MCS1.

According to some examples, determining a value for time duration M may be influenced by time of day changes that may increase or decrease Doppler effects or SNR of a given communication channel. For example, a wireless device located on a college or business campus my experience higher Doppler effects and/or lower SNRs during peak campus hours (e.g., 8 am to 5 pm). The higher Doppler effects may be due to a higher number of vehicles, a higher number of interfering objects (people) or more interfering signals due usage of wireless devices by the higher number of people. An estimate of Doppler effects or SNR for the communication channel used to transmit data packet 300 using either measurement-based or modeling-based estimates of Doppler or SNR may be based on a given time of day and the expected/observed activity levels at the college or business campus.

In some examples, the measurement-based estimate of Doppler may be based on historical measurements by the receiving wireless device for previously received data packets. The measurement-based estimate of Doppler may also be based on one or more measurements at the receiving wireless device of changes in the communication channel between one or more previously received data packets over a given time period (e.g., last minute, last hour, last 24-hour period, etc.).

According to some examples, the model-based estimate of Doppler may be a pre-determined scenario based on estimated environmental traits associated with where the receiving wireless device may be located. For example, a location next to a roadway that has variable traffic flows during different times of the day may use a model that accounts for the variable traffic flows associated with the different times of the day.

In some examples, a value for time duration M=2 may indicate that logic and/or features of the receiving wireless device has determined that the communication channel may be stable enough to skip some pilot signals. In other examples, greater values for time duration M may indicate an even more stable or static communication channel as observed by the receiving wireless device.

Figure 4:
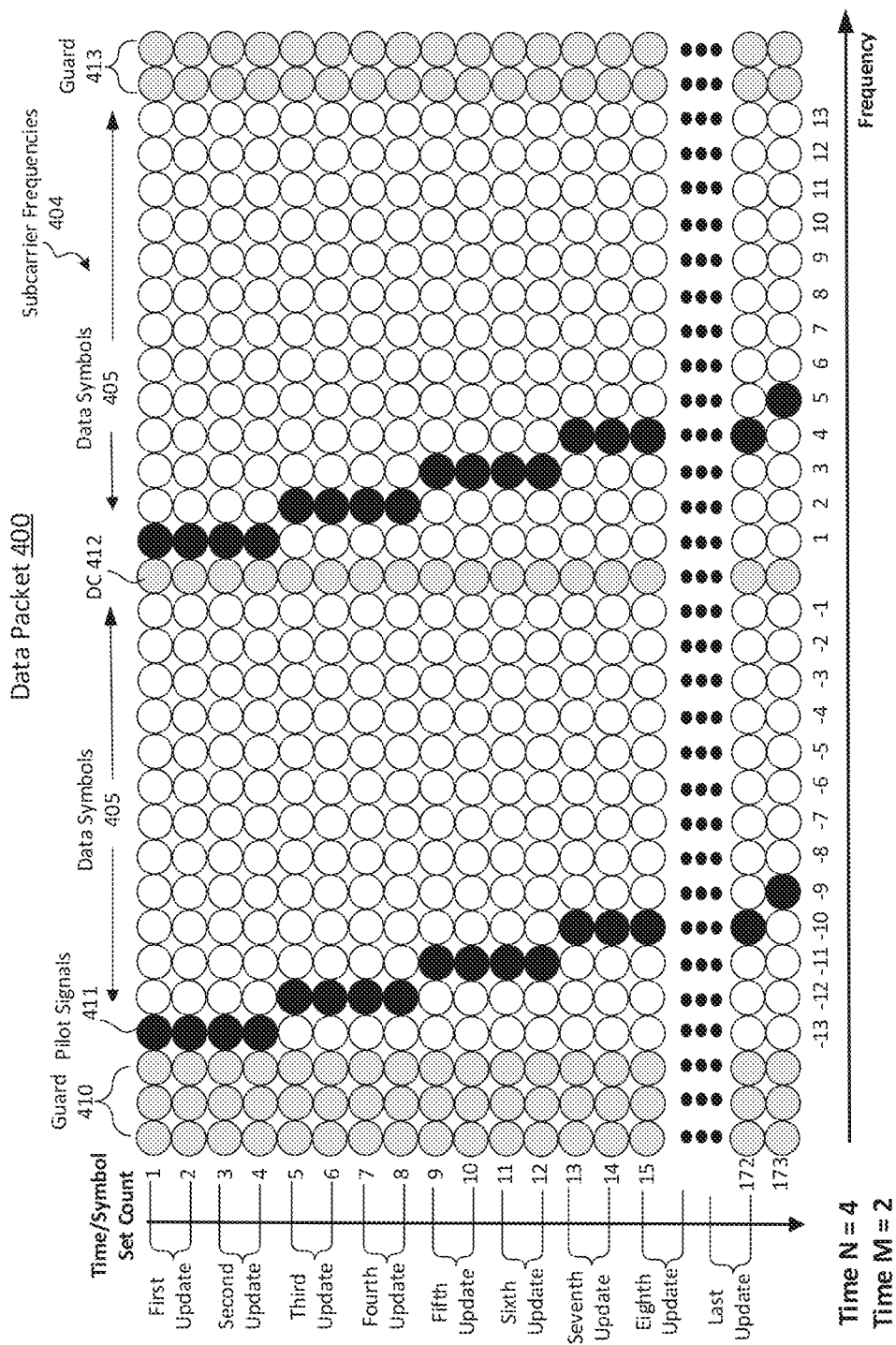
FIG. 4 illustrates an example third data packet.

FIG. 4 illustrates an example third data packet. According to some examples, as shown in FIG. 4, the example third data packet includes data packet 400. For these examples, data packet 400 includes a similar structure to data packets 200 and 300 which the exception of dwell times for pilot signals 411. As shown in FIG. 4, time duration N=4 and thus pilot signals 411 stay assigned to a given subcarrier frequency for a total of 4 symbol set counts before shifting to another subcarrier frequency. Time duration N=4 may indicate some confidence by the transmitting wireless device that the communication channel used to transmit data packet 400 is fairly stable.

According to some examples, as shown in FIG. 4, time duration M=2. For these examples, logic and/or features at a wireless device receiving data packet 400 may update an initial channel estimation of the communication channel using pilot signals 411 included in every other OFDM symbol set.

In some examples, since pilot signals 411 dwell at a given subcarrier frequency for more than one symbol set count, the receiving device may decide to use a weighted average of pilot signals 411 included in two OFDM symbol sets to update the initial channel estimation. For this example, as shown in FIG. 4, for time duration M=2, both a first and a second update to the initial channel estimation may occur using pilot signals assigned to the same subcarrier frequencies. Alternatively, if time duration M was determined to have a value of 4. The receiving wireless device may use a weighted average of pilot signals 411 included in four OFDM symbol sets to update the initial channel estimation. For either of these examples, the weighted average may assign more weight or importance to the most recently received pilot signals 411.

Figure 5:
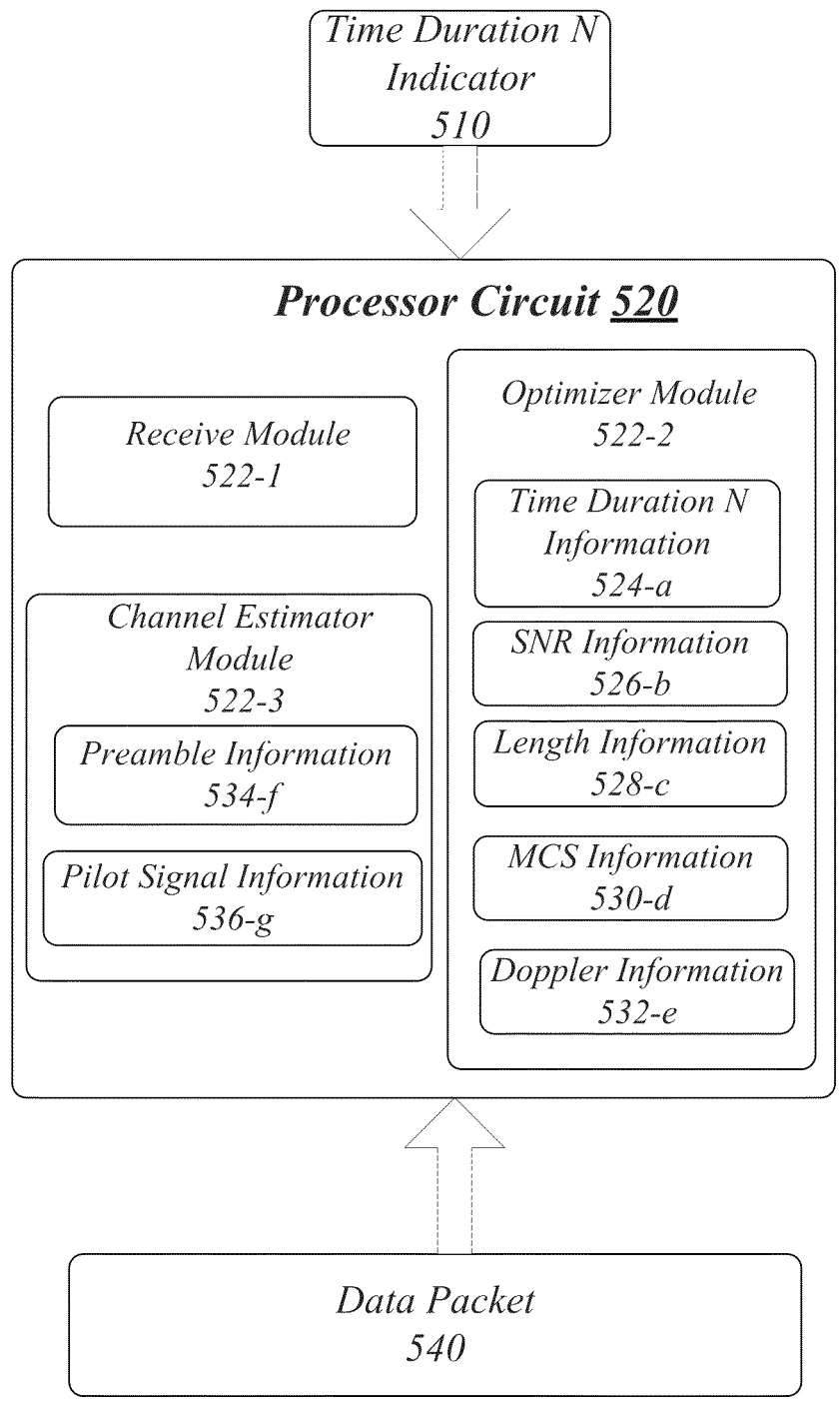
FIG. 5 illustrates an example block diagram for an apparatus.

FIG. 5 illustrates a block diagram for apparatus 500. Although apparatus 500 shown in FIG. 5 has a limited number of elements in a certain topology or configuration, it may be appreciated that apparatus 500 may include more or less elements in alternate configurations as desired for a given implementation.

The apparatus 500 may comprise a computer-implemented apparatus 500 having a processor circuit 520 arranged to execute one or more software modules 522-*a*. It is worthy to note that "a" and "b" and "c" and similar designators as used herein are intended to be variables representing any positive integer. Thus, for example, if an implementation sets a value for a=5, then a complete set of software modules 522-*a* may include modules 522-1, 522-2, 522-3, 522-4 and 522-5. The embodiments are not limited in this context.

According to some examples, apparatus 500 may be part of a wireless device arranged to operate in compliance with one or more wireless technologies such as those described in or associated with the IEEE 802.11 standards. For example, apparatus 500 may be arranged or configured to communicatively couple to one or more wireless devices via a wireless communication channel established and/or operated according to IEEE 802.11ah. The examples are not limited in this context.

In some examples, as shown in FIG. 5, apparatus 500 includes processor circuit 520. Processor circuit 520 may be generally arranged to execute one or more software modules 522-*a*. The processor circuit 520 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, and XScale® processors; and similar processors. Dual microprocessors, multi-core processors, and other multi-processor architectures may also be employed as processor circuit 520. According to some examples processor circuit 520 may also be an application specific integrated circuit (ASIC) and modules 522-*a* may be implemented as hardware elements of the ASIC.

According to some examples, apparatus 500 may include a receive module 522-1. Receive module 522-1 may be arranged for execution by processor circuit 520 to receive a data packet 540 (e.g., in a format similar to data packet 300) via a communication channel. For these examples, data packet 540 may have one or more pilot signals assigned to one or more of a plurality of subcarrier frequencies. The one or more pilot signals may be arranged in data packet 540 to sweep through at least a portion of the plurality of subcarrier frequencies during receipt of data packet 540 at time duration N. For these examples, time duration N may equal a first time duration (e.g., based on symbol set counts) before a given pilot signal at a given subcarrier frequency shifts to another given subcarrier frequency. In some examples, time duration N may be received in a time duration N indicator 510 from a wireless device that transmitted data packet 540.

In some examples, apparatus 500 may also include an optimizer module 522-2. Optimizer module 522-2 may be arranged for execution by processor circuit 520 to determine time duration M. For these examples, time duration M may equal a second time duration (e.g., based on symbol set counts) over which the one or more pilot signals are received by receive module 522-1 during receipt of at least a portion of data packet 540. For these examples, time duration N information 524-*a*, SNR information 526-*b*, length information 528-*c*, MCS information 530-*d* or Doppler information 532-*e* may be information at least temporarily maintained by optimizer module 522-2 (e.g., in a data structure such as a lookup table (LUT)) that may be used to determine a value for time duration M. Time duration N information 524-*a*, SNR information 526-*b*, length information 528-*c*, MCS information 530-*d* or Doppler information 532-*e* may individually or collectively contain information that indicates characteristics of data packet 540 and the communication channel via which data packet 540 is received.

In some examples, apparatus 500 may also include a channel estimator module 522-3. Channel estimator module 522-3 may be arranged for execution by processor circuit 520 to determine an initial channel estimation for the communication channel via which data packet 540 is received. For these examples, preamble information 534-*f* may be information that may have been received by receive module 522-1 in a preamble of data packet 540 and then forwarded to channel estimator module 522-3. Preamble information 534-*f* may be at least temporarily maintained by channel estimator module 522-3 (e.g. in an LUT) and may include information such as one or more long training sequences. Channel estimator module 522-3 may use the one or more long training sequences to determine the initial channel estimation for the communication channel. Also, pilot signal information 536-*g* may be gathered by channel estimator module 522-3 based on pilot signals received over time duration M as determined by optimizer module 522-2. Pilot signal information 536-*g* may also be at least temporarily maintained by channel estimator module 522-3 (e.g., in an LUT) and used to update the initial channel estimation by using individual pilot signals assigned to given subcarrier frequencies or by using weighted average of multiples of pilot signals assigned to the given subcarrier frequencies.

According to some examples, channel estimator module 522-3 may forward both the initial channel estimation and subsequent updates of the initial channel estimation to receive module 522-1. For these examples, receive module 522-1 may make appropriate adjustments to ensure that data packet 540 can continue to be received via a communication channel that may be dynamic or changing over the period of time the data packet 540 is being received.

Various components of apparatus 500 and a device implementing apparatus 500 may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 6 illustrates an example of a first logic flow. As shown in FIG. 6, the first logic flow includes a logic flow 600. Logic flow 600 may be representative of some or all of the operations executed by one or more logic, features, or devices described herein, such as apparatus 500. More particularly, logic flow 600 may be implemented by receive module 522-1, optimizer module 522-2 or channel estimator module 522-3.

In the illustrated example shown in FIG. 6, logic flow 600 may receive a data packet via a communication channel at block 602. For these examples, receive module 522-1 may receive data packet 540 via the communication channel. Data packet 540 may have one or more pilot signals assigned to one or more of a plurality of subcarrier frequencies. The one or more pilot signals may sweep through at least a portion of the plurality of subcarrier frequencies during receipt of the data packet at time duration N. Time duration N may equal a first time duration before a given pilot tone at a given subcarrier frequency shifts to another given subcarrier frequency.

According to some examples, logic flow 600 at block 604 may determine time duration M, where time duration M equals a second time duration over which the one or more pilot signals are received by the receive module 522-1 during receipt of data packet 540. For these examples, optimizer 522-2 may determine time duration M using time duration N information 524-a, SNR information 526-b, length information 528-c, MCS information 530-d or Doppler information 532-e.

According to some examples, logic flow 600 at block 606 may determine an initial channel estimation for the communication channel based on information included in a preamble of the data packet. Logic flow 600 at block 606 may also update the initial channel estimation based on at least a portion of the one or more pilot signals received over the time duration M. For these examples, channel estimator module 522-3 may use preamble information 534-f received in a preamble associated with data packet 540 to determine the initial channel estimation. Pilot signal information 536-g gathered based on time duration M may then be used to update the initial channel estimation.

FIG. 7 illustrates an embodiment of a first storage medium. As shown in FIG. 7, the first storage medium includes a storage medium 700. Storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
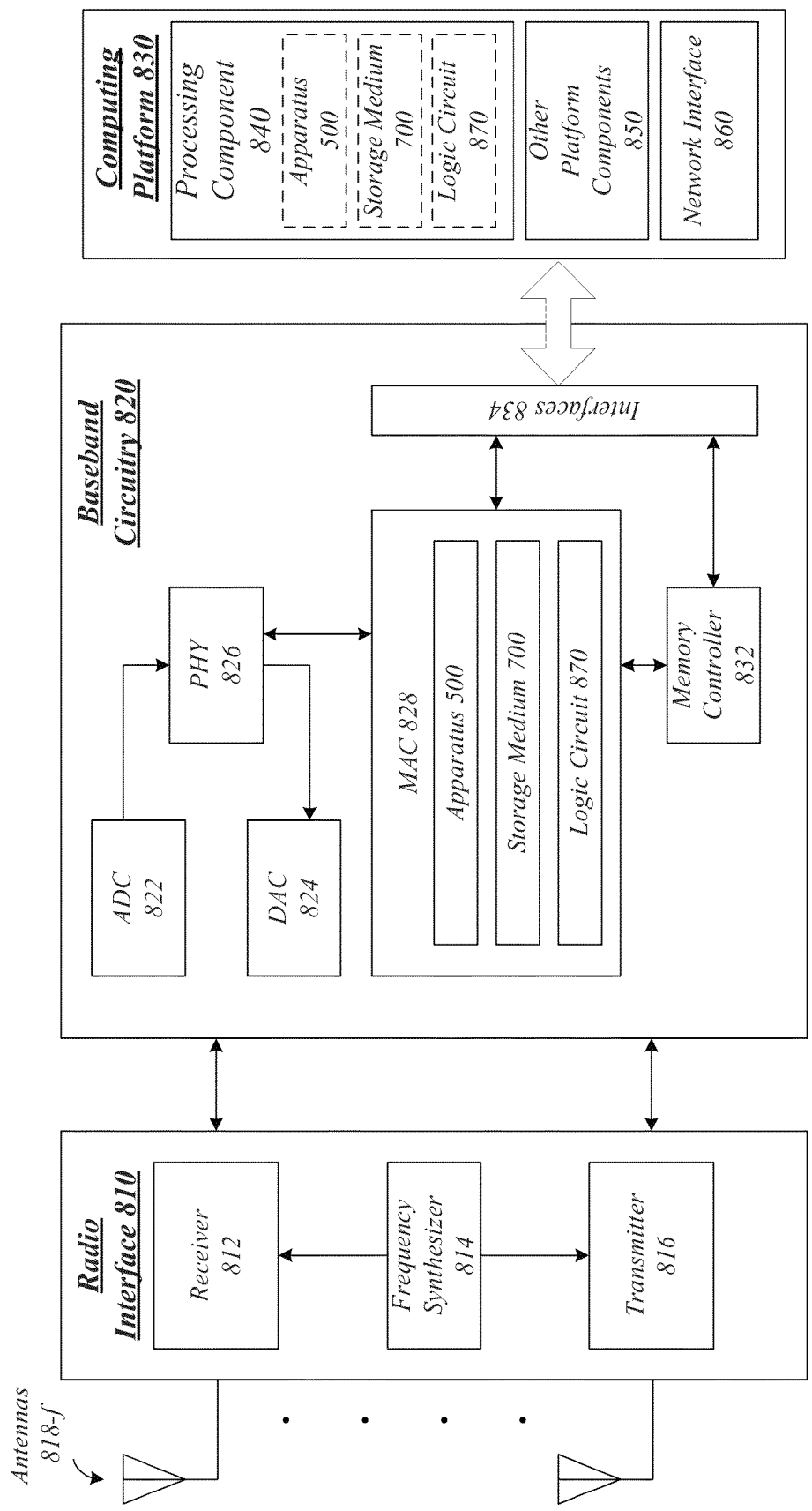
FIG. 8 illustrates an example of a device.

FIG. 8 illustrates an embodiment of a device 800. In some examples, device 800 may be configured or arranged for wireless communications in a wireless network. Device 800 may implement, for example, apparatus 500, storage medium 700 and/or a logic circuit 870. The logic circuit 870 may include physical circuits to perform operations described for apparatus 500 or apparatus 800. As shown in FIG. 8, device 800 may include a radio interface 810, baseband circuitry 820, and computing platform 830, although examples are not limited to this configuration.

The device 800 may implement some or all of the structure and/or operations for apparatus 500, storage medium 700 and/or logic circuit 870 in a single computing entity, such as entirely within a single device. The embodiments are not limited in this context.

In one example, radio interface 810 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 810 may include, for example, a receiver 812, a transmitter 816 and/or a frequency synthesizer 814. Radio interface 810 may include bias controls, a crystal oscillator and/or one or more antennas 818-f. In another embodiment, radio interface 810 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 820 may communicate with radio interface 810 to process receive and/or transmit signals and may include, for example, an analog-to-digital converter 822 for down converting received signals, a digital-to-analog converter 824 for up converting signals for transmission. Further, baseband circuitry 820 may include a baseband or physical layer (PHY) processing circuit 826 for PHY link layer processing of respective receive/transmit signals. Baseband circuitry 820 may include, for example, a processing circuit 828 for medium access control (MAC)/data link layer processing. Baseband circuitry 820 may include a memory controller 832 for communicating with MAC processing circuit 828 and/or a computing platform 830, for example, via one or more interfaces 834.

In some embodiments, PHY processing circuit 826 may include a frame construction and/or detection module, in combination with additional circuitry such as a buffer memory, to construct and/or deconstruct communication frames (e.g., containing subframes). Alternatively or in addition, MAC processing circuit 828 may share processing for certain of these functions or perform these processes independent of PHY processing circuit 826. In some embodiments, MAC and PHY processing may be integrated into a single circuit.

Computing platform 830 may provide computing functionality for device 800. As shown, computing platform 830 may include a processing component 840. In addition to, or alternatively of, baseband circuitry 820 of device 800 may execute processing operations or logic for apparatus 500, storage medium 700, and logic circuit 870 using the processing component 830. Processing component 840 (and/or PHY 826 and/or MAC 828) may comprise various hardware elements, software elements, or a combination of both. Examples of hardware elements may include devices, logic devices, components, processors, microprocessors, circuits, processor circuits (e.g., processor circuit 820), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 830 may further include other platform components 850. Other platform components 850 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 830 may further include a network interface 860. In some examples, network interface 860 may include logic and/or features to support network interfaces operated in compliance with one or more wireless broadband technologies such as those described in one or more standards associated with IEEE 802.11.

Device 800 may be, for example, user equipment, a computer, a personal computer (PC), a desktop computer, a laptop computer, a notebook computer, a netbook computer, a tablet, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 800 described herein, may be included or omitted in various embodiments of device 800, as suitably desired. In some embodiments, device 800 may be configured to be compatible with protocols and frequencies associated with IEEE 802.11 Standards for WLANs and/or sensor networks, although the examples are not limited in this respect.

Embodiments of device 800 may be implemented using single input single output (SISO) architectures. However, certain implementations may include multiple antennas (e.g., antennas 818-f) for transmission and/or reception using adaptive antenna techniques for beamforming or spatial division multiple access (SDMA) and/or using multiple input multiple output (MIMO) communication techniques.

The components and features of device 800 may be implemented using any combination of discrete circuitry, application specific integrated circuits (ASICs), logic gates and/or single chip architectures. Further, the features of device 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

According to some examples, an example first apparatus may include a processor circuit for a wireless device. The example apparatus may also include a receive module arranged for execution by the processor circuit to receive a packet via a communication channel. The packet having one or more pilot signals assigned to one or more of the plurality of subcarrier frequencies. The one or more pilot signals may be arranged to sweep through at least a portion of the plurality of subcarrier frequencies during receipt of the packet at time duration N. Time duration N may equal a first time duration before a given pilot signal at a given subcarrier frequency shifts to another given subcarrier frequency. The example apparatus may also include an optimizer module arranged for execution by the processor circuit to determine time duration M. Time duration M may equal a second time duration over which the one or more pilot signals are received by the receive module during receipt of at least a portion of the packet. The example apparatus may also include a channel estimator module arranged for execution by the processor circuit to determine an initial channel estimation for the communication channel based on information included in a preamble of the packet. The channel estimator may also be arranged to update the initial channel estimation based on at least a portion of the one or more pilot signals received over time duration M.

In some examples for the example apparatus, the plurality of subcarrier frequencies may include an OFDM symbol set. The packet may be received via a plurality of OFDM symbol sets over a given period of time.

According to some examples for the example apparatus, values for time duration N and time duration M may be based on an OFDM symbol count incremented responsive to receipt of each OFDM symbol set, where a value of N=1 or M=1 indicates one OFDM symbol count.

In some examples for the example apparatus, time duration N may have a value of N=1 and time duration M may have a determined value of M=2. The channel estimator module may update the initial channel estimation based on using pilot signals included in every other OFDM symbol set received by the receive module.

According to some examples for the example apparatus, time duration M may be determined based on one or more of a value for time duration N, a signal-to-noise ratio (SNR) for the communication channel, a length of the packet, a modulation coding scheme for receiving the packet or an estimate of Doppler for at least one path associated with the communication channel.

In some examples for the example apparatus, time duration N may be fixed by a transmitter of the packet and a value associated with time duration N may be indicated via at least one of a beacon packet from the transmitter, a management packet for an association exchange or included in the preamble of the packet.

According to some examples for the example apparatus, the wireless device may be configured to operate in compliance with at least one or more wireless communication standards associated with the IEEE 802.11 standards to include IEEE 802.11ah.

In some examples for the example apparatus, the received packet formatted as an IEEE 802.11ah data packet. The channel estimator may be arranged to determine the initial channel estimation based on at least one long training sequence included in the preamble of the IEEE 802.11ah data packet.

According to some examples, the example apparatus may also include a digital display coupled to the processor circuit to present a user interface view for a user of the wireless device.

In some examples, example first methods may include receiving, at a wireless device, a packet via a communication channel. The packet having one or more pilot signals assigned to one or more of the plurality of subcarrier frequencies. The one or more pilot signals may be arranged to sweep through at least a portion of the plurality of subcarrier frequencies during receipt of the packet at time duration N. Time duration N may equal a first time duration before a given pilot signal at a given subcarrier frequency shifts to another given subcarrier frequency. A determination for an initial channel estimation for the communication channel based on information included in a preamble of the packet may then be made. A determination of time duration M may also be made, where time duration M may equal a second time duration over which the one or more pilot signals are received during receipt of at least a portion of the packet via the communication channel. The initial channel estimation may then be updated based on at least a portion of the one or more pilot signals received over the time duration M.

According to some examples for the example first methods, the plurality of subcarrier frequencies may include an OFDM symbol set. The packet may be received via a plurality of OFDM symbol sets over a given period of time.

In some examples for the example first methods, values for time duration N and time duration M may be based on an OFDM symbol count incremented responsive to receipt of each OFDM symbol set, where a value of N=1 or M=1 indicates one OFDM symbol count.

According to some examples for the example first methods, time duration M may be determined based on one or more of a value for time duration N, a signal-to-noise ratio (SNR) for the communication channel, a length of the packet, a modulation coding scheme for receiving the packet or an estimate of Doppler for at least one path associated with the communication channel.

In some examples for the example first methods, determining the estimate of Doppler for at least one path associated with the communication channel may be based on one or more of measurements at the wireless device of changes to the communication channel between one or more previously received packets or historical measurements associated with given time periods over a 24-hour period.

According to some examples for the example first methods, updating the initial channel estimation may be based on the one or more pilot signals received over time duration M to include using a weighted average of the one or more pilot signals received over time duration M.

In some examples for the example methods, the one or more pilot signals may be assigned to one or more of the plurality of subcarrier frequencies to include a first pair of pilot signals separately assigned to a first pair of subcarrier frequencies, the first pair of pilot signals to shift to a second pair of separately assigned subcarrier frequencies at time duration N.

According to some examples for the example first methods, time duration N may be fixed by a transmitter of the packet and a value associated with time duration N to be indicated via at least one of a beacon packet from the transmitter, a management packet for an association exchange or included in the preamble of the packet.

In some examples for the example first methods, the wireless device may be configured to operate in compliance with at least one or more wireless communication standards associated with IEEE 802.11 standards to include IEEE 802.11ah.

According to some examples for the example first methods, the packet may be formatted as an IEEE 802.11ah data packet. Also, determining the initial channel estimation may be based on at least one long training sequence included in the preamble of the IEEE 802.11ah data packet.

According to some examples, at least one machine readable medium comprising a plurality of instructions that in response to being executed on a wireless device cause the wireless device to carry out the example first methods as mentioned above.

In some examples, example second methods may include establishing, at a first wireless device, a communication channel with a second wireless device. The example second methods may also include determining time duration N. Time duration N may equal a time duration before one or more pilot signals included in packets to be transmitted to the second wireless device are to shift from a given assigned subcarrier frequency to another given assigned subcarrier frequency. The determined time duration N may then be indicated to the second wireless device via at least one of a beacon packet, a management packet for an association exchange or in a preamble of one or more packets transmitted to the second wireless device. A packet having one or more pilot symbols assigned to one or more of a plurality of subcarrier frequencies may then transmitted to the second wireless device. The one or more pilot symbols may be arranged to sweep through at least a portion of the subcarrier frequencies during receipt of the packet at the second wireless device at the determined time duration N.

According to some examples for the example second methods,

According to some examples for the example second methods, the plurality of subcarrier frequencies may include an OFDM symbol set. The packet may be transmitted via a plurality of OFDM symbol sets over a given period of time. The determined time N may be based on an OFDM symbol count incremented at the second wireless device responsive to receipt of each OFDM symbol set. For these examples, a value of N=1 indicates one OFDM symbol count.

In some examples for the example second methods, the first wireless device may be configured to operate in compliance with at least one or more wireless communication standards associated with the Institute of Electrical and Electronic Engineers (IEEE) 802.11 standards to include IEEE 802.11ah. For these examples, the packet may be transmitted to the second wireless device formatted as an IEEE 802.11ah data packet.

According to some examples, at least one machine readable medium comprising a plurality of instructions that in response to being executed on a wireless device cause the wireless device to carry out the example second methods as mentioned above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   a processor circuit for a wireless device;
   a receive module arranged for execution by the processor circuit to receive a packet via a communication channel, the packet having one or more pilot signals assigned to one or more of a plurality of subcarrier frequencies, the one or more pilot signals arranged to sweep through at least a portion of the plurality of subcarrier frequencies during receipt of the packet at time duration N, where time duration N equals a first time duration before a given pilot signal at a given subcarrier frequency shifts to another given subcarrier frequency;
   an optimizer module arranged for execution by the processor circuit to determine time duration M, where time duration M equals a second time duration over which the one or more pilot signals are received by the receive module during receipt of at least a portion of the packet; and
   a channel estimator module arranged for execution by the processor circuit to determine an initial channel estimation for the communication channel based on information included in a preamble of the packet, the channel estimator also arranged to update the initial channel estimation based on at least a portion of the one or more pilot signals received over time duration M.

2. The apparatus of claim 1, the plurality of subcarrier frequencies comprising an orthogonal frequency-division multiplexing (OFDM) symbol set, the packet to be received via a plurality of OFDM symbol sets over a given period of time.

3. The apparatus of claim 2, comprising values for time duration N and time duration M based on an OFDM symbol count incremented responsive to receipt of each OFDM symbol set, where a value of N=1 or M=1 indicates one OFDM symbol count.

4. The apparatus of claim 3, comprising time duration N having a value of N=1 and time duration M having a determined value of M=2, the channel estimator module to update the initial channel estimation based on using pilot signals included in every other OFDM symbol set received by the receive module.

5. The apparatus of claim 1, comprising time duration M determined based on one or more of a value for time duration N, a signal-to-noise ratio (SNR) for the communication channel, a length of the packet, a modulation coding scheme for receiving the packet or an estimate of Doppler for at least one path associated with the communication channel.

6. The apparatus of claim 1, comprising time duration N fixed by a transmitter of the packet and a value associated with time duration N to be indicated via at least one of a beacon packet from the transmitter, a management packet for an association exchange or included in the preamble of the packet.

7. The apparatus of claim 1, comprising the wireless device configured to operate in compliance with at least one or more wireless communication standards associated with the Institute of Electrical and Electronic Engineers (IEEE) 802.11 standards to include IEEE 802.11ah.

8. The apparatus of claim 7, comprising the received packet formatted as an IEEE 802.11ah data packet, the channel estimator module arranged to determine the initial channel estimation based on at least one long training sequence included in the preamble of the IEEE 802.11ah data packet.

9. The apparatus of claim 1, comprising a digital display coupled to the processor circuit to present a user interface view for a user of the wireless device.

10. A method comprising:
    receiving, at a wireless device, a packet via a communication channel, the packet having one or more pilot signals assigned to one or more of a plurality of subcarrier frequencies, the one or more pilot signals arranged to sweep through at least a portion of the plurality of subcarrier frequencies during receipt of the packet at time duration N, where time duration N equals a first time duration before a given pilot signal at a given subcarrier frequency shifts to another given subcarrier frequency;
    determining an initial channel estimation for the communication channel based on information included in a preamble of the packet;

determining time duration M, where time duration M equals a second time duration over which the one or more pilot signals are received during receipt of at least a portion of the packet via the communication channel; and updating the initial channel estimation based on at least a portion of the one or more pilot signals received over the time duration M.

11. The method of claim 10, the plurality of subcarrier frequencies comprising an orthogonal frequency-division multiplexing (OFDM) symbol set, the packet to be received via a plurality of OFDM symbol sets over a given period of time.

12. The method of claim 11, comprising values for time duration N and time duration M based on an OFDM symbol count incremented responsive to receipt of each OFDM symbol set, where a value of N=1 or M=1 indicates one OFDM symbol count.

13. The method of claim 10, comprising time duration M determined based on one or more of a value for time duration N, a signal-to-noise ratio (SNR) for the communication channel, a length of the packet, a modulation coding scheme for receiving the packet or an estimate of Doppler for at least one path associated with the communication channel.

14. The method of claim 13, comprising:
determining the estimate of Doppler for at least one path associated with the communication channel based on one or more of measurements at the wireless device of changes to the communication channel between one or more previously received packets or historical measurements associated with given time periods over a 24-hour period.

15. The method of claim 10, comprising updating the initial channel estimation based on the one or more pilot signals received over time duration M to include using a weighted average of the one or more pilot signals received over time duration M.

16. The method of claim 10, comprising the one or more pilot signals assigned to one or more of the plurality of subcarrier frequencies to include a first pair of pilot signals separately assigned to a first pair of subcarrier frequencies, the first pair of pilot signals to shift to a second pair of separately assigned subcarrier frequencies at time duration N.

17. The method of claim 10, comprising time duration N fixed by a transmitter of the packet and a value associated with time duration N to be indicated via at least one of a beacon packet from the transmitter, a management packet for an association exchange or included in the preamble of the packet.

18. The method of claim 10, comprising the wireless device configured to operate in compliance with at least one or more wireless communication standards associated with the Institute of Electrical and Electronic Engineers (IEEE) 802.11 standards to include IEEE 802.11ah.

19. The method of claim 18, comprising the packet formatted as an IEEE 802.11ah data packet, determining the initial channel estimation based on at least one long training sequence included in the preamble of the IEEE 802.11ah data packet.

20. At least one non-transitory machine readable medium comprising a plurality of instructions that in response to being executed on a wireless device cause the wireless device to:
receive a packet via a communication channel, the packet having one or more pilot signals assigned to one or more of a plurality of subcarrier frequencies, the one or more pilot signals to sweep through at least a portion of the plurality of subcarrier frequencies during receipt of the packet at time duration N, where time duration N equals a first time duration before a given pilot signal at a given subcarrier frequency shifts to another given subcarrier frequency;

determine an initial channel estimation for the communication channel based on information included in a preamble of the packet;

determine time duration M, where time duration M equals a second time duration over which the one or more pilot signals are received during receipt of at least a portion of the packet via the communication channel; and update the initial channel estimation based on at least a portion of the one or more pilot signals received over time duration M.

21. The at least one non-transitory machine readable medium of claim 20, the plurality of subcarrier frequencies comprising an orthogonal frequency-division multiplexing (OFDM) symbol set, the packet to be received via a plurality of OFDM symbol sets over a given period of time.

22. The at least one non-transitory machine readable medium of claim 21, comprising values for time duration N and time duration M based on an OFDM symbol count incremented responsive to receipt of each OFDM symbol set, where a value of N=1 or M=1 indicates one OFDM symbol count.

23. The at least one non-transitory machine readable medium of claim 22, comprising time duration N having a value of N=4 and time duration M having a determined value of M=2, the instructions to further cause the wireless device to determine a first update to the initial channel estimation based on using a first average of a first pair of pilot signals at a first subcarrier frequency, determine a second update to the initial channel estimation based on using a second average of a second pair of pilot signals at the first subcarrier frequency and then determine a third update to the initial channel estimation based on using a third average of a third pair of pilot signals at a second subcarrier frequency.

24. The at least one non-transitory machine readable medium of claim 20, comprising time duration M determined based on one or more of a value for time duration N, a signal-to-noise ratio (SNR) for the communication channel, a length of the packet, a modulation coding scheme for receiving the packet or an estimate of Doppler for at least one path associated with the communication channel.

25. The at least one non-transitory machine readable medium of claim 20, comprising time duration N fixed by a transmitter of the packet and a value associated with time duration N to be indicated via at least one of a beacon packet from the transmitter, a management packet for an association exchange or included in the preamble of the packet.

26. The at least one non-transitory machine readable medium of claim 20, comprising the instructions to cause the wireless device to operate in compliance with at least one or more wireless communication standards associated with the Institute of Electrical and Electronic Engineers (IEEE) 802.11 standards to include IEEE 802.11ah.

27. The at least one non-transitory machine readable medium of claim 26, comprising the packet formatted as an IEEE 802.11ah data packet, the initial channel estimation determined based on at least one long training sequence included in the preamble of the IEEE 802.11ah data packet.

28. A method comprising:
establishing, at a first wireless device, a communication channel with a second wireless device;

determining time duration N, where time duration N equals a time duration before one or more pilot signals included in packets to be transmitted to the second wireless device are to shift from a given assigned subcarrier frequency to another given assigned subcarrier frequency;

indicating the determined time duration N to the second wireless device via at least one of a beacon packet, a management packet for an association exchange or in a preamble of one or more packets transmitted to the second wireless device; and transmitting a packet to the second wireless device, the packet having one or more pilot symbols assigned to one or more of a plurality of subcarrier frequencies, the one or more pilot signals arranged to sweep through at least a portion of the subcarrier frequencies during receipt of the packet at the second wireless device at the determined time duration N.

29. The method of claim 28, the plurality of subcarrier frequencies comprising an orthogonal frequency-division multiplexing (OFDM) symbol set, the packet to be transmitted via a plurality of OFDM symbol sets over a given period of time, the determined time N based on an OFDM symbol count incremented at the second wireless device responsive to receipt of each OFDM symbol set, where a value of N=1 indicates one OFDM symbol count.

30. The method of claim 28, the first wireless device configured to operate in compliance with at least one or more wireless communication standards associated with the Institute of Electrical and Electronic Engineers (IEEE) 802.11 standards to include IEEE 802.11ah, transmitting the packet to the second wireless device comprises formatting the packet as an IEEE 802.11ah data packet.

* * * * *